(12) United States Patent
Wallace

(10) Patent No.: US 8,875,330 B2
(45) Date of Patent: Nov. 4, 2014

(54) CHILD SAFETY AND SUPPORT PILLOW DEVICE

(71) Applicant: Nikesha Nicole Wallace, Murrieta, CA (US)

(72) Inventor: Nikesha Nicole Wallace, Murrieta, CA (US)

( * ) Notice: Subject to any disclaimer, the term of this patent is extended or adjusted under 35 U.S.C. 154(b) by 0 days.

(21) Appl. No.: 14/095,221

(22) Filed: Dec. 3, 2013

(65) Prior Publication Data

US 2014/0173828 A1      Jun. 26, 2014

Related U.S. Application Data

(60) Provisional application No. 61/797,387, filed on Dec. 6, 2012.

(51) Int. Cl.
*A47C 20/00* (2006.01)
*A47C 7/38* (2006.01)

(52) U.S. Cl.
CPC ........................................ *A47C 7/38* (2013.01)
USPC ................ 5/636; 5/632; 5/637; 5/655; 5/603; 5/633

(58) Field of Classification Search
USPC ....................... 5/632, 633, 636, 637, 655, 603
See application file for complete search history.

(56) References Cited

U.S. PATENT DOCUMENTS

| | | | | |
|---|---|---|---|---|
| 4,683,601 A | * | 8/1987 | Lagin | 5/652 |
| 4,829,613 A | * | 5/1989 | Yon | 5/652 |
| 5,154,691 A | * | 10/1992 | Box et al. | 602/5 |
| 5,363,523 A | * | 11/1994 | Blackburn | 5/630 |
| 5,692,246 A | * | 12/1997 | Benedick | 2/463 |
| D400,041 S | * | 10/1998 | Selner | D6/597 |
| D414,367 S | * | 9/1999 | Esseltine et al. | D6/599 |
| 6,052,849 A | * | 4/2000 | Dixon et al. | 5/643 |
| D470,274 S | * | 2/2003 | Houser | D29/122 |
| 6,830,050 B1 | * | 12/2004 | Bamdad et al. | 128/845 |
| 6,857,150 B2 | * | 2/2005 | Matthews Brown et al. | 5/655 |
| 6,957,462 B1 | * | 10/2005 | Wilcox | 5/636 |
| D516,854 S | * | 3/2006 | Emoff | D6/601 |
| D526,571 S | * | 8/2006 | Terrasi | D9/629 |
| 7,322,062 B1 | * | 1/2008 | Matthews | 5/636 |
| D612,654 S | * | 3/2010 | Eura et al. | D6/601 |
| D617,058 S | * | 6/2010 | Akrey | D30/154 |
| 8,316,488 B2 | * | 11/2012 | Rojas | 5/637 |
| 2007/0143927 A1 | * | 6/2007 | Noro et al. | 5/653 |
| 2009/0307846 A1 | * | 12/2009 | Eura et al. | 5/636 |
| 2013/0283533 A1 | * | 10/2013 | Bendickson | 5/636 |

* cited by examiner

*Primary Examiner* — Robert G Santos
*Assistant Examiner* — David E Sosnowski

(57) ABSTRACT

An invention designed for head, neck, chest and abdomen; providing support and protection for sleeping children while being transported. The said invention comprises of head, neck, chest and abdomen safety. It is constructed in the shape of a heart and extends between the head and abdomen of child. The invention is comprised of filling and cushion and is able to separate between sections for washing capability. It is worn over the front of the child, secured by elastic straps that slip over each arm of the child, represented on the backside of invention. It is further secured by seatbelts that are placed under confinement of the situated seatbelt safety controllers located on the front side of the invention.

7 Claims, 3 Drawing Sheets

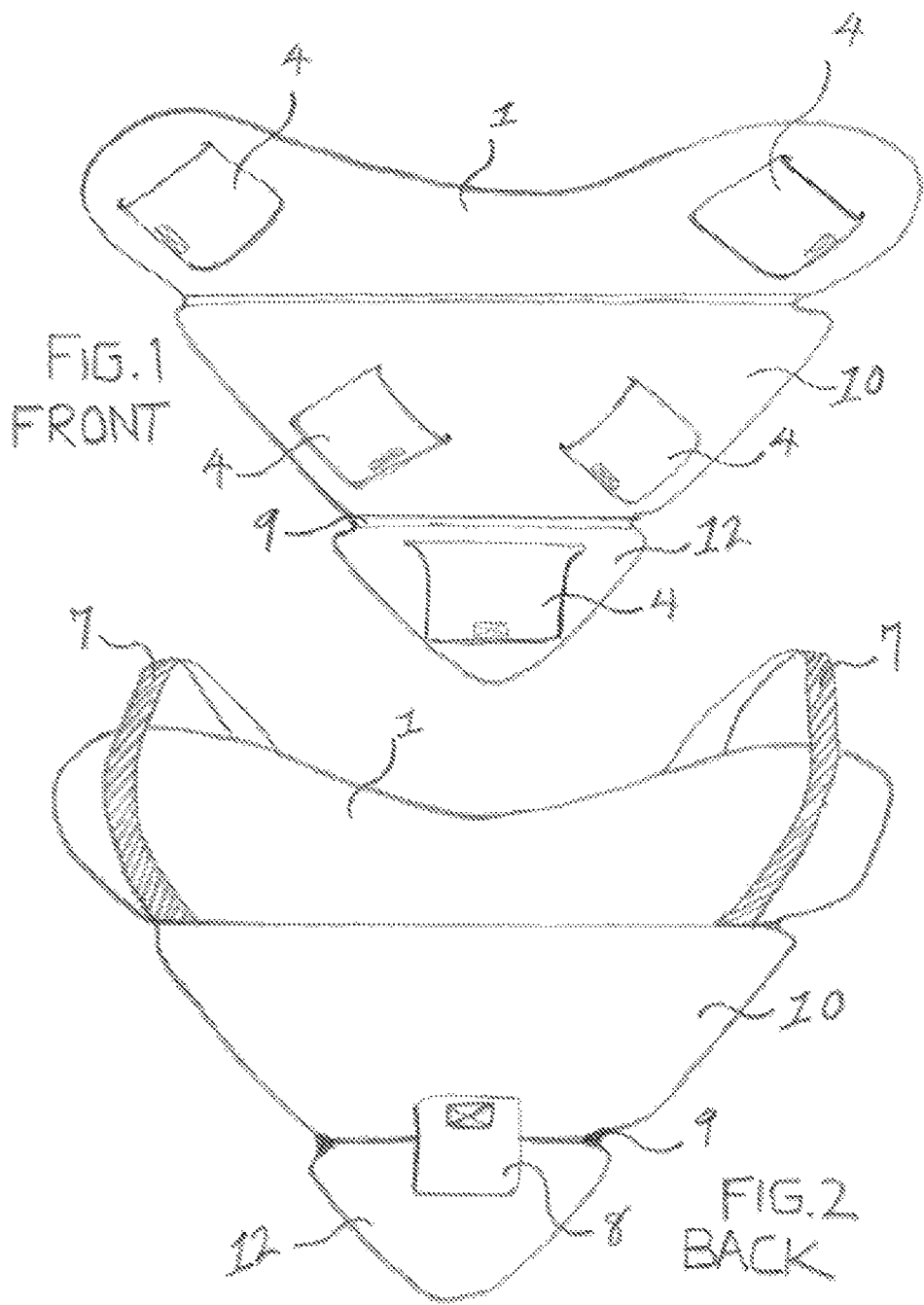

SIDE (TRANSPARENT)

EXPLODED VIEW

CHILD SAFETY AND SUPPORT PILLOW DEVICE

BACKGROUND OF THE INVENTION

The present invention relates to a safety and support pillow device useful for children during transport. The pillow device offers support of the head and neck of the child while sleeping during transport, allowing the head and neck to be relieved from uncomfortable pressure that can result in pain or damage. The top section of said invention is sculpted for specific support of the neck and head of child, whereupon the head or neck may fall at a variety of angles during sleep. The top section is built to withstand under the weight of the child's head and angles which the resting child's head may fall during sleep. The top section will hold in place for the duration of its use.

In addition the present invention also offers support for the child's chest, neck and abdomen area. When accidents occur, seatbelt impact is capable of crushing and causing harm to children. The present invention is also supplied as a chest, neck and abdomen aid, filled with supportive cushion whereas the top, middle and bottom section of the invention are a means of safety and support while secured in front of the child. The invention is created to fit between the seatbelt and child during transport, providing cushion in case of impact caused by sudden stops or accidents during transport.

In addition the present invention will work with car seats, boosters and will continue to work with no car seat or booster, providing continuing support and safety for children of many ages.

DETAILED DESCRIPTION OF THE INVENTION

A pillow device comprised for safe and supportive transport of children wherein a head and neck rest 1 built with cushion and filling 2 are means for safety and support of the child's head and neck while sleeping during transport. The top section of said invention 1, is specifically designed with curve and widens into upward folds that appear as the top section of a heart shape. As best seen in FIG. 1, this is to ensure that the child's head would be supported while falling at a variety of angles during sleep. It will hold up under the full weight of sleeping child's head throughout the duration of the inventions use.

In addition to support the child's vital areas such as the neck, chest and abdomen in case of sudden stops or impacts, the present invention is created with cushioned sections that can help resist the seatbelts when accidents occur. The invention presented provides a head and neck cushioned section 2, a cushioned chest section 10, 11 and a cushioned abdomen and height setting section area 12, 13. These sections of invention while set before the child, will aid in resisting the impact of seatbelts against the child. This will be further implemented by the seatbelt safety controllers situated in the front of present invention 4. They are fastened and secured by fasteners 5, 6 attached to seatbelt controller 4 to the top section of invention 1, mid-section of invention 10, and bottom section of invention 12.

In addition the present invention is secured to child by elastic arm straps 7 located on the backside of top section of invention 1, and is further secured when placed in front of the child and help in place by the seatbelt safety controllers 4 in front of the invention.

In addition the present invention offers the ability to be washed throughout use. All three sections of invention are held in together as one by front fold flaps 9. As best seen in FIGS. 1-3 the folds are placed, one between top section 1 and mid-section 10. The second is placed between mid-section 10 and bottom section 12. These allow for sections to be released and secured by fastener 8, located on the backside of present invention. The first fastener 8 is located between the top section 1 and mid-section 10 for release. The second fastener 8 is located between mid-section 10 and bottom section 12 for release. Both fasteners are to be used for release and fastening. The fastener 8 will expose the zippers 3 between the present inventions sections. As best seen in FIG. 2, this exposure enables the filling inside the top section 2 to be removed from top section 1. This exposure also allows for mid-section filling 11 to be removed from mid-section 10. This exposure also allows for bottom section 13 to be removed from bottom section 12. Once all fillings are removed from invention, the fabric body of presented invention can be washed and returned to child for regular use.

BRIEF DESCRIPTION OF DRAWINGS

FIG. 1: Is frontal view of the present invention; displaying seatbelt security and safety controls 4 situated and affixed to top section of invention 1, mid-section of invention 10 and bottom section of invention 12. It also discloses a reference to a front fold flap 9 between mid-section of invention 10 and bottom section of invention 12.

FIG. 2: Is back view of invention; displaying top section of invention 1 having attachments, elastic arm straps 7. It also discloses the bottom section of invention/height setting, and a reference to fasteners 8 that will release sections of invention to enable height adjustment and washing.

Figure 3:
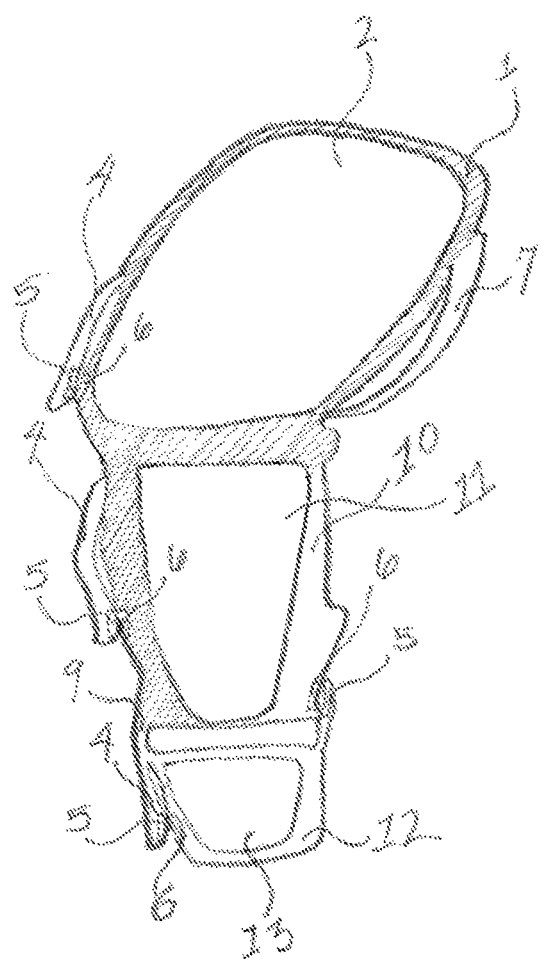
FIG. 3: Is transparent view of present invention; displaying the inside filling for top section 1, mid-section 10 and bottom section 12. It also further discloses arrangement of seatbelt safety controllers 4. It further discloses arrangements for fasteners 5, 6. It further discloses arrangements for elastic arm straps 7. It further discloses arrangement for frontal casing flaps 9.
Figure 4:
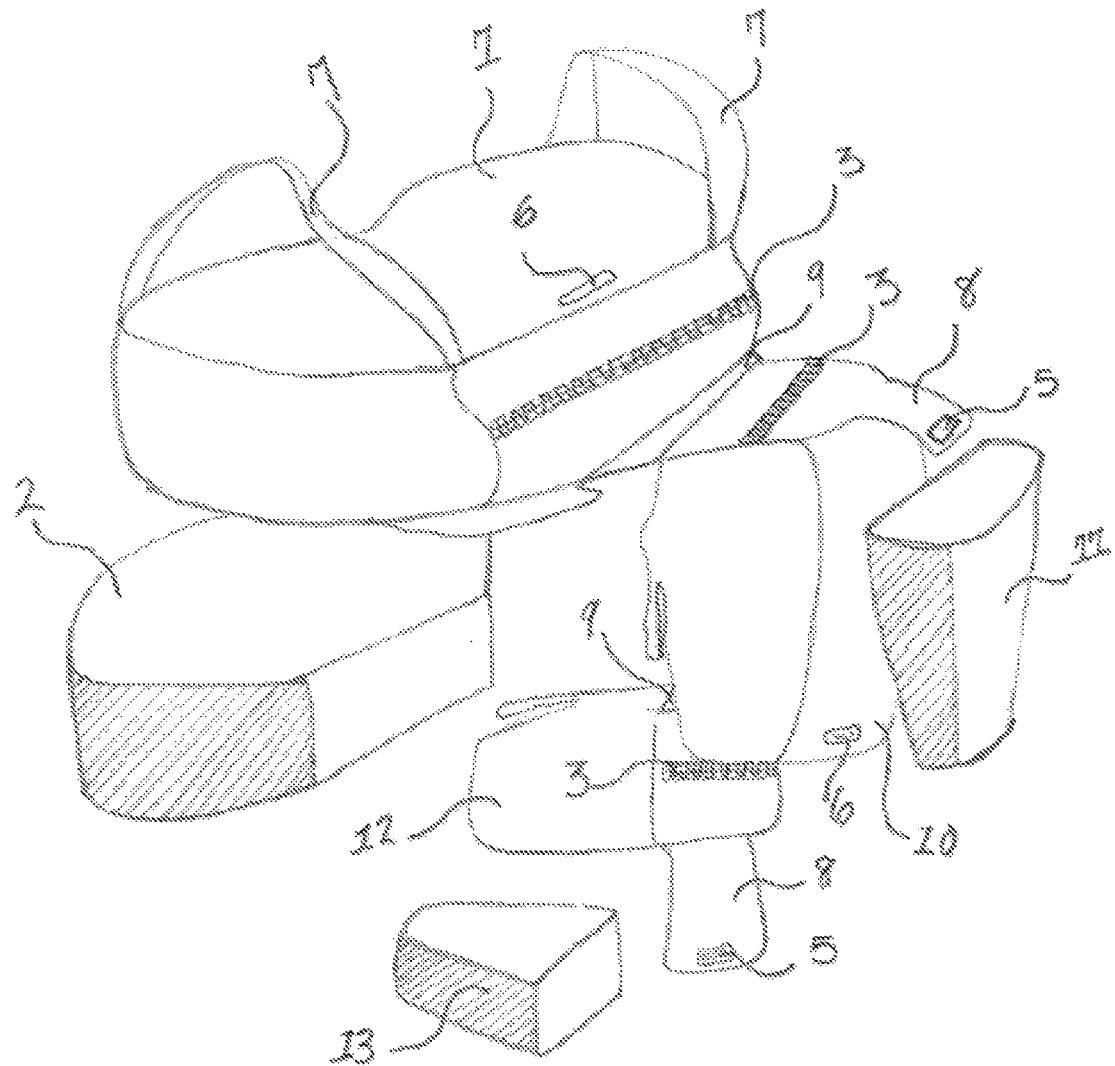
FIG. 4: Is exploded view of present invention; displaying interior view of the sections while separated. It discloses the present invention's ability to have its inner fillings removed. It discloses that there are three zippers 3 which can open to have the inner fillings withdrawn. Top section 1 can be unzipped 3 and have its inner filling removed 2. Mid-section 10 can be unzipped 3 and have its inner filling removed 11. Bottom section 12 can be unzipped 3 and have its inner filling removed 13. It further discloses the release tabs between sections 8. The top section 1 and mid-section 10 can be released and separated from the other by release and fastener 8. The mid-section and bottom section can be released and separated from the other by release and fastener 8.

The invention claimed is:
1. A child safety and support pillow device comprising:
a generally heart shaped cushion, the cushion comprising three releasably connected sections, the sections being a generally trapezoidal top section, a generally trapezoidal middle section, and a generally triangular bottom section;
the top section being connected to the middle section via a first fold flap and a first releasable tab and the middle section being connected to the bottom section via a second fold flap and a second releasable tab;
the top section having a width greater than that of the middle section which in turn has a width greater than that of the bottom section;
at least two arm straps connected to the top section;

a plurality of seatbelt safety controllers, first and second controllers of the plurality of seatbelt safety controllers being attached to the top section, third and fourth controllers of the plurality of seatbelt safety controllers being attached to the middle section, and a fifth controller of the plurality of seatbelt safety controllers being attached to the bottom section; and wherein the first and fourth controllers each form angled loops and are aligned so as to accommodate a torso restraining portion of a seatbelt in a first direction, wherein the second and third controllers each form angled loops and are aligned so as to accommodate a torso restraining portion of a seatbelt in a second direction and wherein the fifth controller forms a loop that is generally horizontal and is configured to accommodate a generally horizontal waist and hip restraining portion of a seatbelt.

2. The device of claim 1, further comprising a fastener located at a terminal end of each of the first and second releasable tabs.

3. The device of claim 1, wherein each of the sections comprises a zipper configured to permit a filling to be removed from each respective section.

4. The device of claim 3, wherein the filling is comprised of soft foam and polyester.

5. The device of claim 1, wherein the releasable tabs are located toward a back side of the device such that they are hidden from view when the device is viewed from the front.

6. The device of claim 1, wherein each of the seatbelt safety controllers has a releasable fastener located at a terminal end thereof.

7. The device of claim 6, wherein the fasteners are one of hook and loop fasteners, buttons, or snaps.

* * * * *